(12) United States Patent
Kato et al.

(10) Patent No.: US 8,776,979 B2
(45) Date of Patent: Jul. 15, 2014

(54) PARKING LOCK APPARATUS

(75) Inventors: Yosuke Kato, Gotemba (JP); Michitaka Tsuchida, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/703,651

(22) PCT Filed: Jun. 22, 2010

(86) PCT No.: PCT/JP2010/004146
§ 371 (c)(1),
(2), (4) Date: Dec. 12, 2012

(87) PCT Pub. No.: WO2011/161719
PCT Pub. Date: Dec. 29, 2011

(65) Prior Publication Data
US 2013/0087427 A1  Apr. 11, 2013

(51) Int. Cl.
*F16H 61/28* (2006.01)
*B60T 1/06* (2006.01)

(52) U.S. Cl.
USPC .................. 192/219.5; 192/222; 188/162

(58) Field of Classification Search
None
See application file for complete search history.

(56) References Cited

U.S. PATENT DOCUMENTS

| | | | |
|---|---|---|---|
| 6,044,931 A * | 4/2000 | Reed et al. | 74/606 R |
| 6,510,934 B2 | 1/2003 | Arakawa | |
| 7,565,850 B2 * | 7/2009 | Reik et al. | 74/606 R |
| 7,845,248 B2 * | 12/2010 | Yoshiyama et al. | 192/219.6 |
| 7,987,959 B2 * | 8/2011 | Itazu et al. | 192/219.5 |
| 8,037,972 B2 * | 10/2011 | Fujita | 188/31 |
| 2007/0281827 A1 | 12/2007 | Shimizu et al. | |

FOREIGN PATENT DOCUMENTS

| | | |
|---|---|---|
| JP | 2000-85551 | 3/2000 |
| JP | 2007-284036 | 11/2007 |

* cited by examiner

*Primary Examiner* — Rodney Bonck
(74) *Attorney, Agent, or Firm* — Finnegan, Henderson, Farabow, Garrett & Dunner, LLP

(57) ABSTRACT

Disclosed is a parking lock apparatus which can prevent an electric actuator from being accessed from the outside of the vehicle, and thereby can prevent the function of the parking lock apparatus from being lowered as well as can reduce the production cost in comparison with the conventional parking lock apparatus. The parking lock apparatus comprises an electric actuator 11 to be activated in response to the shift operation, and a parking lock apparatus 12 capable of selectively taking a parking lock maintained state to have the stoppage state of a vehicle 1 maintained or a parking lock released state to have the stoppage state of the vehicle 1 released. The electric actuator 11 is disposed between a first housing 1H partly constituting an engine 2 for generating a power and a second housing 2H partly constituting a transaxle 3 for transmitting the power generated by the engine 2.

3 Claims, 12 Drawing Sheets

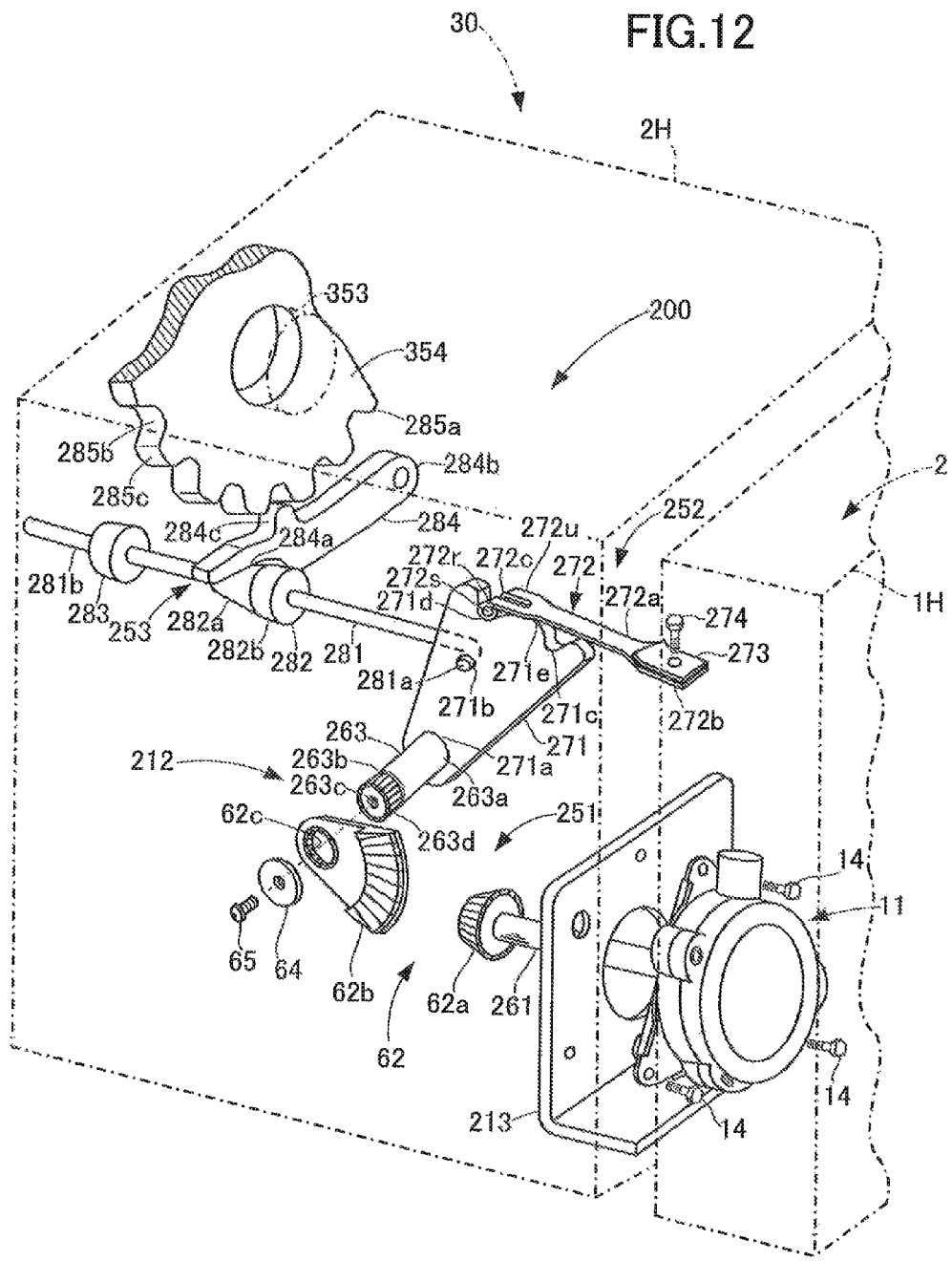

PARKING LOCK APPARATUS

CROSS-REFERENCE TO RELATED APPLICATIONS

This application is a national phase application of International Application No. PCT/JP2010/004146, filed Jun. 22, 2010, the content of which is incorporated herein by reference.

TECHNICAL FIELD

The present invention relates to a parking lock apparatus, and more particularly to a parking lock apparatus which is mounted on a vehicle such as an automotive vehicle and provided with an electric actuator to be activated in response to the shift operation by a driver.

BACKGROUND ART

As a conventional parking lock apparatus of this type, there has so far been known a parking lock apparatus which comprises a parking gear and a parking pawl provided, in a power transmission apparatus for transmitting the power outputted from an engine to an axle, an electric actuator to be activated to selectively engage the parking pawl with the parking gear or disengage the parking pawl from the parking gear, and a connecting mechanism to connect the parking pawl with the electric actuator to have the parking pawl operated by the electric actuator (for example see Patent Document 1).

The parking lock apparatus disclosed in the Patent Document 1 is constructed to have the electric actuator and the connecting mechanism disposed on the side wall portion of a housing accommodating therein a power transmission. The side wall portion of the housing is in the rear side of the axle and in the vicinity of the axle, and thus take a position overlapped with the axle when seen from the front side of the vehicle. The electric actuator is accommodated in a casing having a rear portion at which there are arranged an electric motor and a lead line connector.

The conventional parking lock apparatus is constructed to be switched to selectively take a parking lock maintained state to maintain the stoppage of the vehicle or a parking released state to release the stoppage of the vehicle when the electric actuator is activated in response to the driver's shift operation.

Further, the conventional parking lock apparatus is constructed to have the electric actuator and the connecting mechanism disposed on the side wall portion of a housing accommodating therein a power transmission, the side wall portion of the housing being in the rear side of the axle and in the vicinity of the axle, and thus taking the position overlapped with the axle when seen from the front side of the vehicle, so that the electric actuator and the connecting mechanism are behind the axle and cannot seen from the front side of the vehicle. This leads to the fact that a special member or members are not required to be provided for protecting the electric actuator and the connecting mechanism from flying stones.

Further, if the conventional parking lock apparatus is constructed to have the electric motor and the lead line connector provided in the rear portion of the casing of the electric actuator, the casing of the electric actuator leads to serve as a protection wall occupying the section relatively low in strength. The conventional parking lock apparatus is constructed to protect the electric actuator and the connecting mechanism from flying stones without introducing the increases in the number of parts and in the production cost.

CITATION LIST

Patent Literature

Patent Document 1 Japanese Patent Application Publication No. 2000-085551

SUMMARY OF INVENTION

Solution to Problem

The parking lock apparatus disclosed as previously mentioned is constructed to have the electric actuator and the connecting mechanism disposed in the rear side of the axle to be protected from the flying stones, however, disposed at the side wall portion of the housing of the power transmission apparatus, viz., disposed at the outside of the housing, so that the electric actuator and the connecting mechanism can easily be accessed and contacted by someone.

The electric actuator and the connecting mechanism assembled in the vehicle having the conventional parking lock apparatus mounted thereon is easily accessed from the outside of the vehicle. As a consequence, there is a possibility that the electric actuator and the connecting mechanism are removed from the parking lock mechanism, or otherwise the actuator is activated from the outside of the vehicle, thereby leading to lowering the function of the parking lock mechanism.

In order to overcome the possibility of lowering the function of the parking lock mechanism, it may be considered to have the electric actuator and the connecting mechanism strengthened in structure and secured to the wall portion of the housing of the power transmission apparatus by a special bolts which cannot be removed from the wall portion of the housing. Or otherwise, it may be considered that the electric motor partly forming the electric actuator is constructed not to be operated only by the energization of the electric motor in lieu of a SR motor (Switched Reluctance Motor) to be controlled by an electric signal. However, any measures thus considered lead to such a problem as increasing the costs of the constitution elements and parts of the parking lock apparatus and thus the production cost of the parking lock apparatus.

The present invention has been made to overcome the previously mentioned conventional problems, and it is therefore an object of the present invention to provide a parking lock apparatus which can prevent the electric actuator from being accessed from the outside of the vehicle, and thereby can prevent the function of the electric actuator from being lowered as well as can reduce the production cost in comparison with the conventional parking lock apparatus.

Solution to Problem

To achieve the above object, the parking lock apparatus according to the present invention comprises an electric actuator to be activated in response to the shift operation, and a parking lock mechanism to be operated by the electric actuator and capable of selectively taking a parking lock maintained state to have the stoppage state of the vehicle maintained or a parking lock released state to have the stoppage state of the vehicle released, the electric actuator being disposed between a first housing partly constituting a power generation apparatus for generating a power and a second housing partly constituting a power transmission apparatus for transmitting the power generated by the power generation apparatus.

The above parking lock apparatus is constructed to have the electric actuator disposed between the first housing and the second housing, so that the electric actuator and the parking lock mechanism cannot entirely be accessed from the outside of the vehicle.

The vehicle having a conventional parking lock apparatus mounted thereon is constructed to have an actuator disposed outside of the housing, so that the electric actuator and the parking lock mechanism can easily be removed and manipulated from the outside of the vehicle, thereby leading to a possibility that the vehicle can be in the state that the vehicle can be moved.

In contrast, the parking lock apparatus according to the present invention is constructed to have the electric actuator which cannot be accessed from the outside of the vehicle, thereby causing no possibility that the parking lock apparatus is lowered in function, and making it possible to obtain an effect to improve the reliability of the parking lock apparatus.

Therefore, the electric actuator and the parking lock mechanism are not required to be reinforced or increased in mechanical strength nor to use special fastening bolts for fastening the electric actuator to the vehicle, resulting from the fact that the electric actuator and the parking lock mechanism cannot be accessed from the outside of the vehicle and thus cannot be contacted by someone. Another advantageous effect is such that the electric actuator is not required to be constituted by an SR motor relatively expensive and not operated only with energization.

As a result, the parking lock apparatus according to the present invention can use a DC motor relatively inexpensive and low in accuracy and fastening bolts inexpensive in compliance with the standard, so that the parking lock apparatus can obtain such an advantageous effect that the parking lock apparatus can remarkably reduce the production cost as compared with the conventional parking lock apparatus.

In the parking lock apparatus set forth in the above definition, (2) the electric actuator is supported on a support portion provided on at least either one of the first housing and the second housing, the electric actuator being disposed in a space surrounded by the inner wall portion of the first housing and the inner wall portion of the second housing.

The parking lock apparatus thus defined is constructed to have the electric actuator supported on the support portion and disposed in the space between the first housing and the second housing, thereby making it impossible for the electric actuator to be accessed from the outside of the vehicle with certainty. As a result, the electric actuator and the parking lock mechanism cannot entirely be accessed from the outside of the vehicle, thereby causing no possibility that the parking lock apparatus is lowered in function, and making it possible to obtain an effect to improve the reliability of the parking lock apparatus.

In the parking lock apparatus set forth in the above definition, (3) the second housing has an extension portion extending toward the first housing.

The parking lock apparatus thus defined is constructed to have the second housing with an extension portion extending toward the first housing, so that the electric actuator can be disposed in the space between the first housing and the extension portion of the second housing. The conventional parking lock apparatus is constructed to be disposed in a relatively small space between the first housing and the second housing, however, the parking lock apparatus according to the present invention is constructed to have the second housing formed with the extension portion, so that the extension portion can secure a space allowing the electric actuator to be disposed therein with certainty.

In the parking lock apparatus set forth in the above definition, (4) the parking lock mechanism has a switching mechanism that is switched to selectively take a parking position corresponding to the parking lock maintained state or a non-parking position corresponding to the parking lock released state, a transmission mechanism that transmits the activation of the electric actuator to the switching mechanism, and a lock mechanism that locks not to output the power from the power transmission apparatus when the switching mechanism is switched to the parking position.

The parking lock apparatus thus defined is constructed to have the electric actuator disposed in the space between the first housing and the second housing, so that the electric actuator and the parking lock mechanism cannot be accessed from the outside of the vehicle. As a consequence, there is no possibility that the parking lock mechanism of the parking lock apparatus is lowered in function, thereby making it possible to improve the reliability of the parking lock mechanism.

Therefore, the electric actuator and the parking lock mechanism are not required to be reinforced or increased in mechanical strength nor to use special fastening bolts for fastening the electric actuator to the vehicle, resulting from the fact that the electric actuator and the parking lock mechanism cannot be accessed from the outside of the vehicle and thus cannot be contacted by someone. Another advantageous effect is such that the electric actuator is not required to be constituted by a SR motor relatively expensive and not operated only with energization. As a result, the parking lock apparatus according to the present invention can use a DC motor relatively inexpensive and high in accuracy and fastening bolts inexpensive in compliance with the standard, so that the parking lock apparatus can obtain such an advantageous effect that the parking lock apparatus can remarkably reduce the production cost as compared with the conventional parking lock apparatus.

Further, the parking lock mechanism in the first embodiment is provided with the transmission mechanism, the switching mechanism and the lock mechanism, so that the parking lock maintained state and the parking released state can be promptly reliably switched by the operation of the driver.

Advantageous Effects of Invention

The parking lock apparatus according to the present invention can prevent the electric actuator from being accessed from the outside of the vehicle, and thereby can prevent the function of the electric actuator from being lowered as well as can reduce the production cost in comparison with the conventional parking lock apparatus.

BRIEF DESCRIPTION OF DRAWINGS

FIG. 12 is an exploded perspective view of the parking lock apparatus according to the third embodiment of the present invention.

DESCRIPTION OF EMBODIMENTS

The first to third embodiments of the parking lock apparatus according to the present invention will be described hereinafter with reference to the accompanying drawings.

First Embodiment

FIGS. 1 to 9 shows a parking lock apparatus 10 according to the first embodiment of the present invention.

Figure 1:
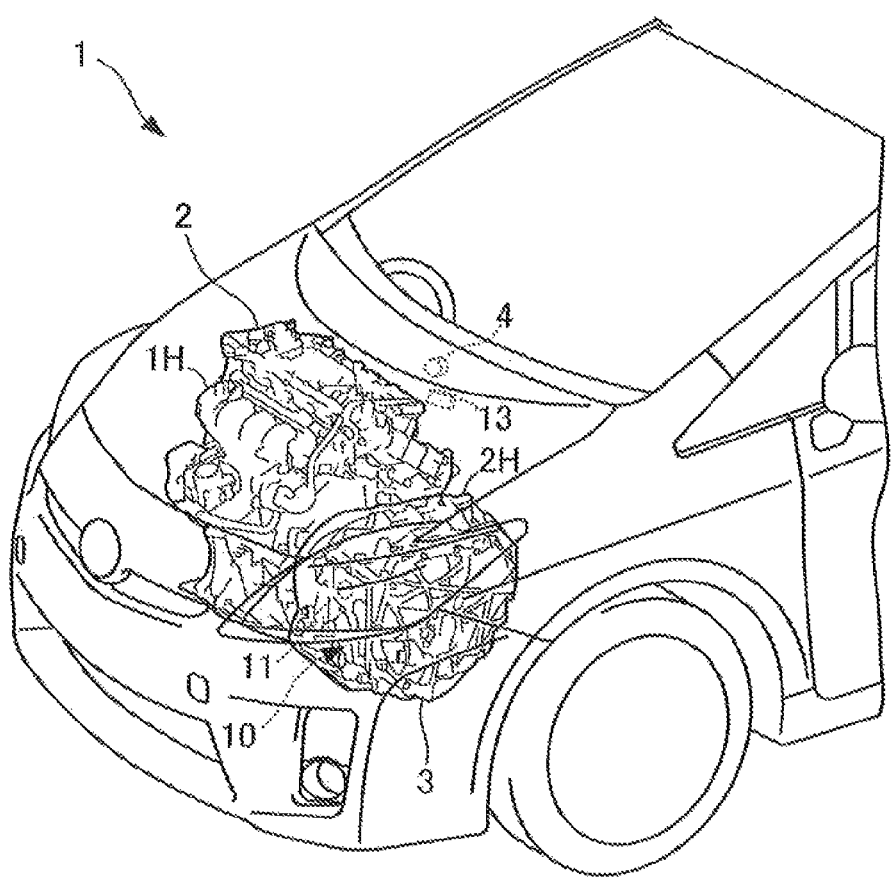
FIG. 1 is a perspective view of the front portion of a vehicle showing an engine having mounted thereon a parking lock apparatus according to the first embodiment of the present invention.

As shown in FIG. 1, the parking lock apparatus 10 is provided in a transaxle 3 operatively connected with an engine 2 of a vehicle 1, and constructed to have the rotation of the output shaft forming part of the transaxle 3 selectively locked or unlocked in response to the shift operation conducted by a driver of the vehicle 1.

This means that the parking lock apparatus 10 is constructed to be capable of selectively taking a parking lock maintained state to have the stoppage state of the vehicle maintained or a parking lock released state to have the stoppage state of the vehicle released.

The engine 2 in the first embodiment is constituted by a gasoline engine of a four-cylinder in-line horizontal type constituting a power generation apparatus defined in the present invention.

The power generation apparatus defined in the present invention is not limited to the engine 2 in the first embodiment, but may be constituted by any other engine. The power generation apparatus may be constituted by a multi-cylinder such as three-cylinder in-line engine and six-cylinder in-line engine, a multi-cylinder of a V-type or a vertical type, and a fuel engine such as a diesel engine and the like.

The power generation apparatus defined in the present invention may be an engine constituted by an electric rotation machine such as a motor and the like and a fuel engine mounted on what is called a hybrid automotive vehicle, or otherwise an engine constituted by a driving source such as an electric rotation machine mounted on an electric automotive vehicle. The transaxle 3 is corresponding to a power transmission apparatus defined in the present invention.

The power transmission apparatus defined in the present invention may be provided with a transmission for continuously or steppedly changing the speed of an output rotation shaft forming part of the power transmission apparatus. The power transmission apparatus may be constituted for example by any one of mechanical, hydraulic, and electric types of transmission.

The parking lock apparatus 10 is constituted by what is called a shift-by-wire type of shift control system which can detect a driver's shift operation input with sensors or switches to select a shift position in response to a detected signal, so that the parking lock apparatus can switch the shift positions including a parking position and non-parking positions excluding the parking position.

The parking lock apparatus is constructed to be switched to the parking position to lock the output shaft, thereby maintaining the parking lock maintained state when a parking switch 4 provided near a driver's seat of the vehicle 1 is operated into a "ON" state. When, on the other hand, the parking switch 4 is operated for releasing the parking lock maintained state, the parking lock apparatus is switched to the non-parking position to unlock the output shaft, thereby maintaining the parking lock released state.

The detailed construction of the parking lock apparatus 10 according to the first embodiment of the present invention will be explained hereinafter.

Figure 2:
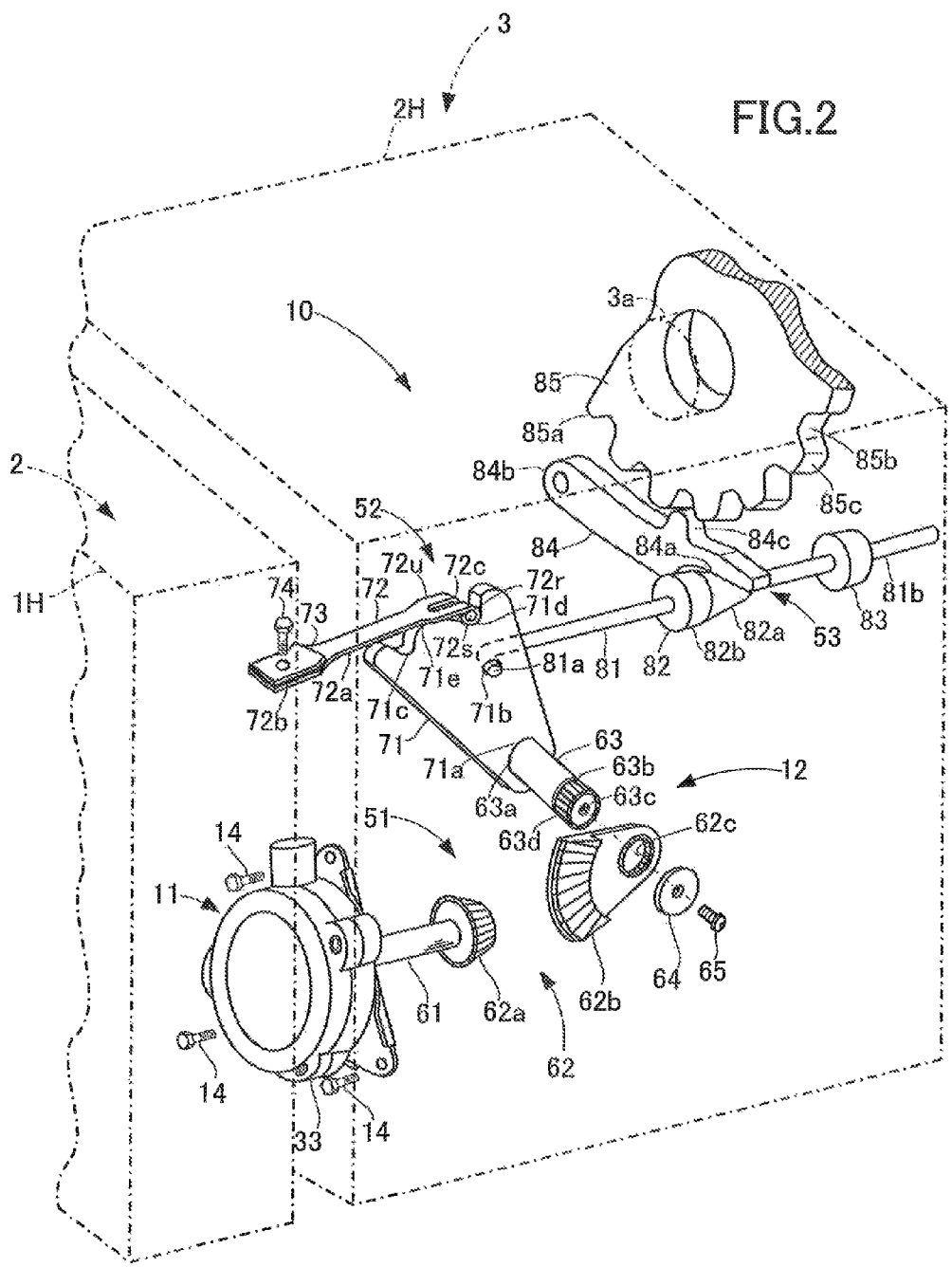
FIG. 2 is an exploded perspective view of the parking lock apparatus according to the first embodiment of the present invention.

The parking lock apparatus 10 is constructed as shown in FIGS. 1, 2 to include an electric actuator 11, a parking lock mechanism 12, an electronic control unit (hereinafter simply referred to as an ECU) 13 for controlling the electric actuator 11, and fastening bolts 14 for securing the electric actuator 11 to the transaxle 3.

The electric actuator 11 and the parking lock mechanism 12 in the first embodiment constitute in combination a parking lock apparatus defined in the present invention.

Figure 3:
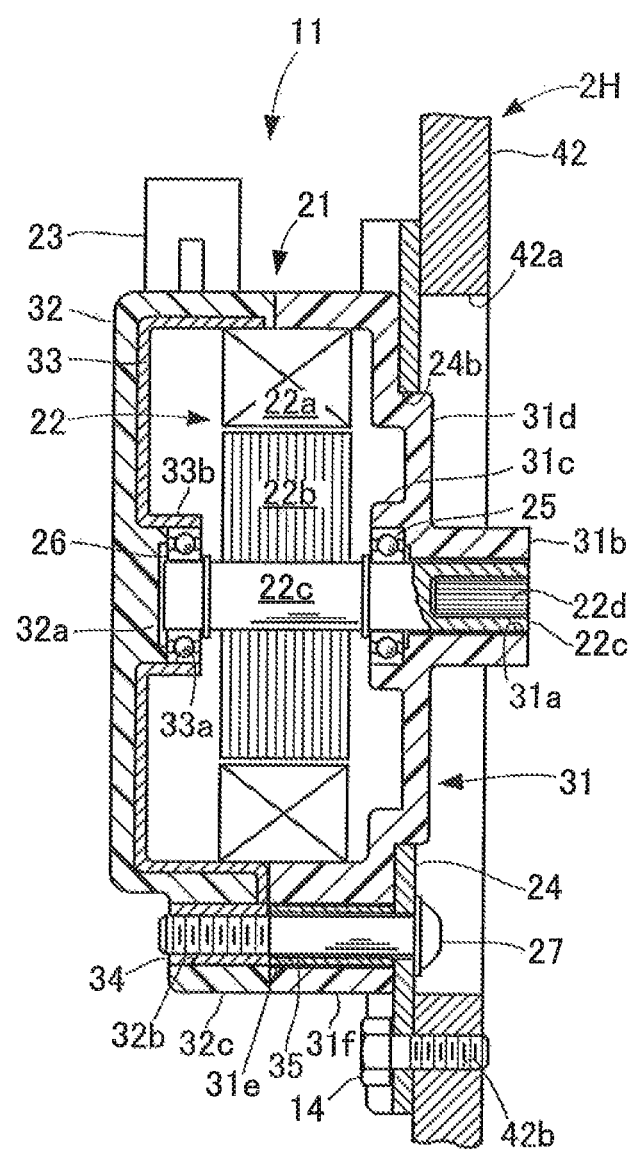
FIG. 3 is a cross-sectional view of an electric actuator forming part of the parking lock apparatus according to the first embodiment of the present invention.
Figure 4:
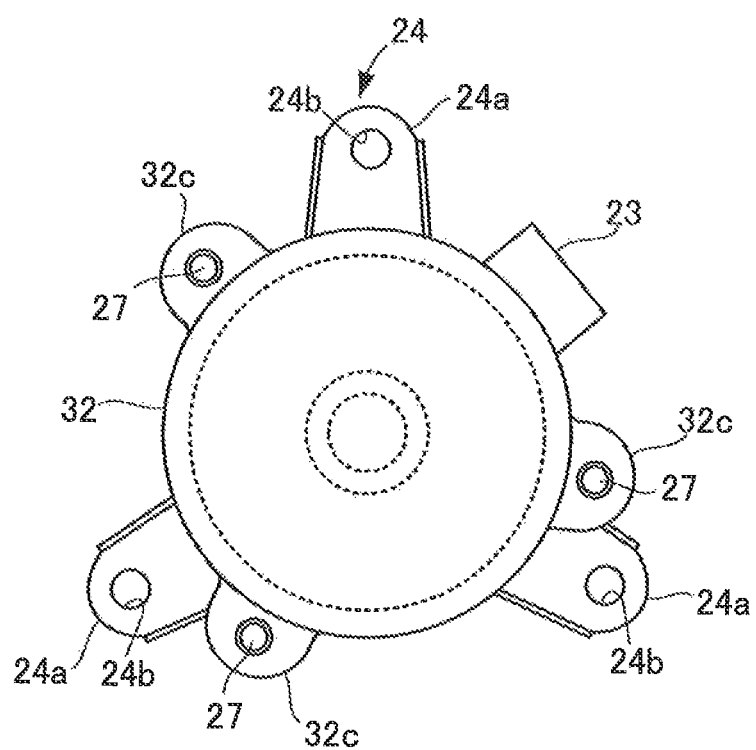
FIG. 4 is a front view of the electric actuator of the parking lock apparatus according to the first embodiment of the present invention.

The electric actuator 11 is constituted as shown in FIGS. 3, 4 to include a case 21, a motor 22 accommodated in the case 21, a connector 23, a bracket 24, bearings 25, 26, and fastening bolts 27.

The case 21 has a body 31, an outer cover 32, an inner cover 33 integrally formed with the outer cover 32, inserts 34 each formed with a screw hole, and spacers 35 each formed with a through bore.

The body 31 is formed by a resin, and has a boss 31b formed with a through bore 31a, a boss 31c supporting the bearing 25, a boss 31d received in the bracket 24, and a boss 31f formed with three through bores 31e equi-angularly in the body 31.

The through bores 31e respectively allow the spacers 35 to be received therein, and the spacers 35 respectively allow the fastening bolts 27 to be received therein.

The outer cover 32 is formed by a resin, and has a boss 32a projecting inwardly of the central portion of the outer cover 32 to be received in the inner cover 33, and bosses 32c formed in opposing relationship with the bosses 31f of the body 31, respectively, and each having a through bore 32b.

The through bores 32b of the outer cover 32 are integrally formed with the inserts 34, respectively, and each of the inserts 34 allow the fastening bolt 27 to be received therein.

The inner cover is formed by a metal, and has a boss 33b projecting inwardly of the central portion of the inner cover 33 and formed with a through bore 33a. The boss 33b is adapted to accommodate therein a bearing 26 and to retain the bearing 26 together with the boss 32a of the outer cover 32.

The outer cover 32 and the inner cover 33 are secured to the body 31 and the bracket 24 by the fastening bolts 27.

The motor 22 is constructed to include a stator 22a having a permanent magnet and an electromagnet, a rotor 22b formed with a wound wire, and a DC motor having a rotor shall 22c.

The rotor 22b is energized with a direct current by the command of the ECU 13 to become an electromagnet. This electromagnet and the magnet of the stator 22a are repeatedly attracted or repulsed to rotate the rotor 22b.

The stator 22a is supported at its outer peripheral portion by the case 21. The rotor 22b is integrally formed with the rotor shafts 22c and thus rotated together with the rotor shaft 22c. The rotor shaft 22c has one end portion rotatably supported on the bearing 26, and an intermediate portion rotatably supported on the bearing 25. Further, the rotor shaft 22 has the other end portion formed with splined inner teeth 22d through which the rotor shaft 22 is connected with the parking lock mechanism 12, so that the rotation of the rotor shaft 22c is transmitted to the parking lock mechanism 12.

The connector 23 is secured at its base portion to the outer cover 32 of the case 21, and has one end electrically connected with the ECU 13 and the other end electrically connected with the rotor 22b of the motor 22 through contacts including a commutator and a brush not shown in the drawings.

The bracket 24 is made of a molded metal plate, and has three fastening portions 24a circumferentially equally spaced apart from each other. The fastening portions 24a are respectively formed with through bores 24b each having a fastening bolt 14 received therein. The bracket 24 has a central portion formed with a through bore 24b allowing the boss 31d of the body 31 of the case 21 to be received therein to support the body 31.

Each of the bearings 25, 26 is constituted by a rolling bearing such as a ball bearing and the like to rotatably support the rotator shaft 22c of the motor 22.

The fastening bolt 27 is constituted by a general screw bolt in compliance with a standard such as a JIS standard.

Figure 5:
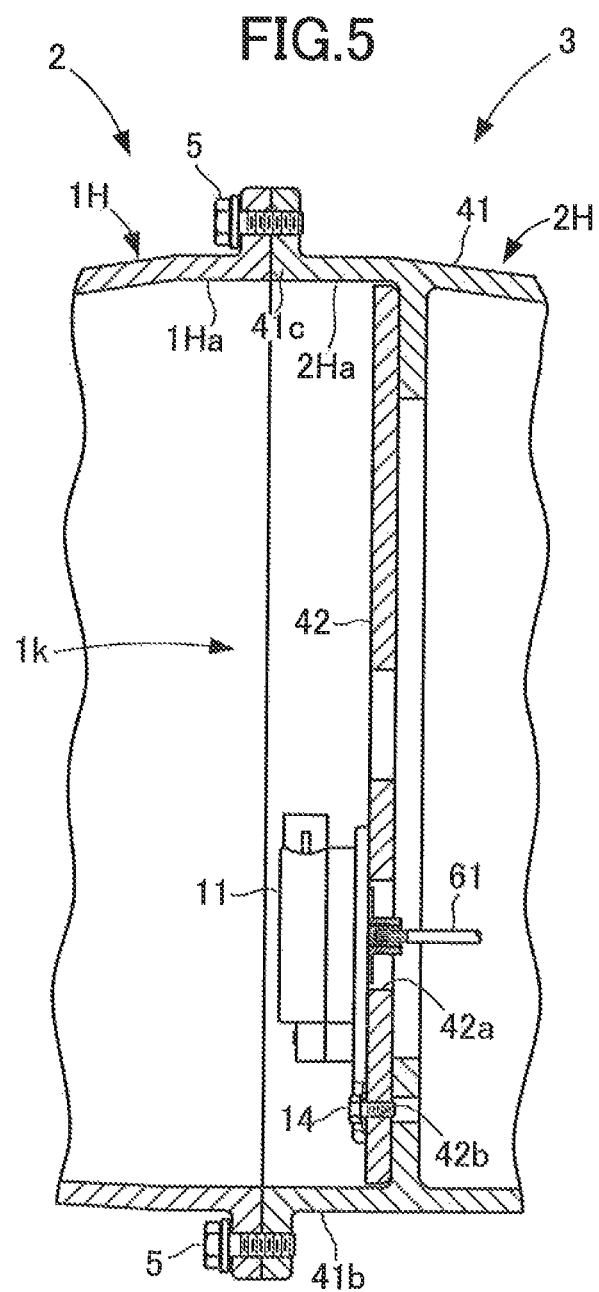
FIG. 5 is a cross-sectional view of a portion to which the electric actuator of the parking lock apparatus according to the first embodiment of the present invention is connected.

The electric actuator 11 is disposed as shown in FIG. 5 in a space 1k surrounded by the inner wall portion 1Ha of a first housing 1H partly constituting the engine 2 and the inner wall portion 2Ha of a second housing 2H partly forming the transaxle 3

Figure 6:
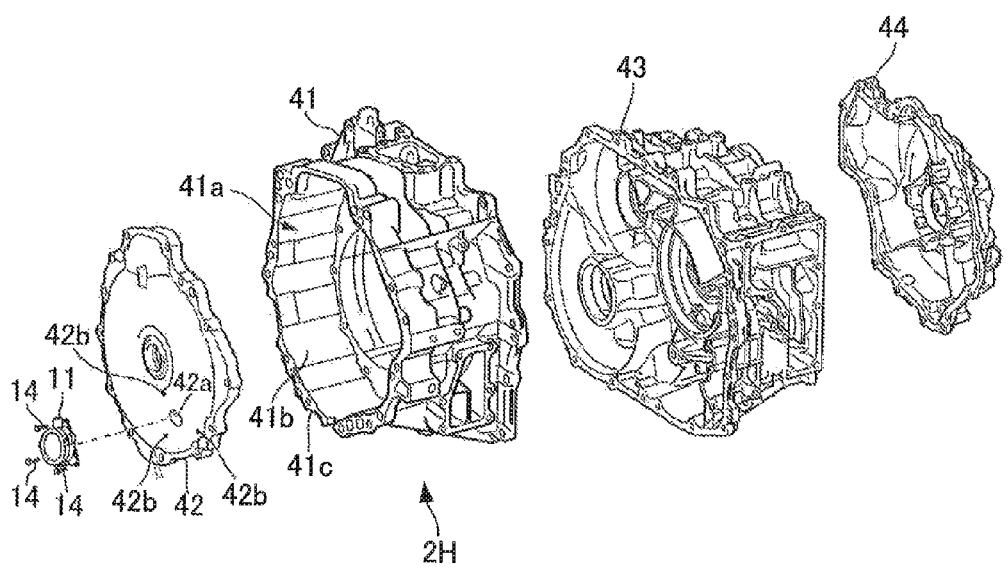
FIG. 6 is an exploded perspective view of a case of a transaxle in which the parking lock apparatus according to the first embodiment of the present invention is assembled.

The first housing 1H has a cylinder block and a crank case not shown in the drawings. The second housing 2H has a transaxle housing 41, a transaxle housing cover 42, a transaxle housing case 43, and a transaxle rear cover 44 as shown in FIG. 6.

The transaxle housing 41 has an inner wall portion 41b surrounding the opening portion 41a facing the first housing 1H. The inner wall portion 41b has an extension portion 41c extending at the opening portion 41a toward the first housing 1H to accommodate therein the electric actuator 11.

The electric actuator 11 may be disposed in the space surrounded by the inner wall portion 41b of the transaxle housing 41 without forming the above extension portion 41c according to the present invention. The transaxle housing 41 is secured to the first housing 1H by a plurality of fastening bolts 5 as shown in FIG. 5.

The transaxle housing cover 42 is formed with a through bore 42a perforating the transaxle housing cover 42 in the thickness direction of the transaxle housing cover 42 to allow the boss 31c of the electric actuator 11 to be received therein. Further, the transaxle housing cover 42 is formed with three through bore 42b perforating the transaxle housing cover 42 in the thickness direction of the transaxle housing cover 42 to allow the fastening bolts 14 to be received therein.

The transaxle housing cover 42 in the first embodiment constitutes a support portion for supporting the electric actuator in the parking lock mechanism according to the present invention.

The parking lock mechanism 12 is constituted as shown in FIG. 2 to include a transmission mechanism 51, a switching mechanism 52, and a lock mechanism 53.

The transmission mechanism 51 is constituted to include a power transmission shaft 61 connected with the electric actuator 11, a gear module 62 for transmitting the power between the two shafts respectively having center axes perpendicular to each other, a parking shaft 63 connected with the gear module 62, and a washer 64 and a screw 65 for fastening the gear module 62 to the parking shaft 63. The transmission mechanism 51 is adapted to transmit the operation of the electric actuator 11, viz., the power outputted from the electric actuator 11 to the switching mechanism 52 by converting the power on the same plane but in the perpendicular direction.

The power transmission shaft 61 has one end portion formed with an outer spline gear to be held in spline engagement with the rotor shaft 22c of the electric actuator 11, and the other end portion connected with the gear module 62.

The gear module 62 is partly constituted by a conical bevel gear, and has a small diameter side gear 62a, and a large diameter side gear 62b held in mesh with the small diameter side gear 62a. The gear 62a and the gear 62b are held in mesh with each other to have the gear 62b rotated around the center axis of the parking shaft 63 in response to the rotation of the gear 62a around the center axis of the power transmission shaft 61.

The gear 62b is in a fan shape formed by partly cutting a disc, and has a central portion serving as a rotation center formed with a through bore 62c having an inner spline gear. The previously mentioned bevel gear may be a straight bevel gear having straight tooth traces, or otherwise a twisted bevel gear having twisted tooth traces.

The parking shaft 63 has one end portion 63a connected with the switching mechanism 52 and the other end portion 63b connected with the large diameter side gear 62b of the gear module 62. The one end portion 63a of the parking shaft 63 is coupled with the switching mechanism 52, so that the parking shaft 63 can be rotated together with the switching mechanism 52. The other end portion 63b of the parking shaft 63 is formed with a screw hole 63c axially extending, and an outer spline teeth 63d held in spline engagement with the inner spline teeth formed in the through bore 62c of the gear 62b of the gear module 62, so that the other end portion 63b of the parking shaft 63 is secured to the gear 62b of the gear module 62 by the screw 65.

The parking shaft 63 is rotatably supported on the second housing 2H of the transaxle 3 through a bearing not shown in the drawings.

The switching mechanism 52 comprises a detent lever 71, a detent spring 72, a spring retainer 73, and an attaching bolt 74. The switching mechanism 52 is constructed to be switched to selectively take a parking position corresponding to a parking lock maintained state to maintain the stoppage of the vehicle 1 or a non-parking position corresponding to a parking released state to release the stoppage of the vehicle 1.

The detent lever 71 has a connection portion 71a, an engagement portion 71b, engagement concave portions 71c, 71d, and an engagement convex portion 71e formed between the engagement concave portions 71c and 71d. The connection portion 71a is connected with the parking shaft 63, so that the detent lever 71 can be rotated together with the parking shaft 63.

The engagement portion 71b of the detect lever 71 is formed with a through bore allowing the part of the lock mechanism 53 to be received therein and thus engaged with a part of the lock mechanism 53, so that the lock mechanism 53 can be operated in response to the pivotal movement of the detent lever 71. More specifically, the detent lever 71 is pivoted around the connection portion 71a, whereupon the lock mechanism 53 is moved by the engagement portion 71b of the detent lever 71 by the movement distance varied in response to the pivot angle of the detent lever 71.

The engagement concavity portion 71c is formed to be engaged with the part of the detent spring 72, so that the engagement of the engagement concavity portion 71c and the part of the detent spring 72 thus established can determine the pivotal position of the detent lever 71, thereby causing the vehicle 1 to be switched to the parking lock maintained state.

Similarly, the engagement concavity portion 71d is formed to be engaged with the part of the detent spring 72, so that the engagement of the engagement concavity portion 71d and the part of the detent spring 72 thus established can determine the pivotal position of the detent lever 71, thereby causing the vehicle 1 to be switched to the parking lock released state.

The detent spring 72 has a body 72a, an attaching portion 72b, and a roller portion 72c. The roller portion 72c is adapted to be engaged with the engagement concavity portions 71c, 71d of the detent lever 71 at a predetermined contact pressure force (N) when the roller portion 72c is positioned in the engagement concavity portions 71c, 71d of the detent lever 71.

The body 72a of the detent spring 72 is formed by a plate spring made of a resilient material, and has one end portion formed as the attaching portion 72b and the other end portion formed integrally with the roller portion 72c. The attaching portion 72b of the detent spring 72 is formed with a through bore allowing an attaching bolt 74 to be received therein, so that the detect spring 72 and the spring retainer 73 can be bolted and thus secured to the second housing 2H of the transaxle 3 by the attaching bolt 74. The roller portion 72c of the detent spring 72 has a roller 72r, a support shaft 72s for rotatably supporting the roller 72r, and support portions 72u for supporting the both axial end portions of the support shaft 72s.

The spring retainer 73 serves to retain the attaching portion 72b of the detent spring 72 to the transaxle 3, and to prevent the excessive deformation of the body 72a of the detent spring 72 when the body 72a of the detent spring 72 is resiliently deformed.

With the above construction of the detent lever 71 and the detent spring 72, the roller 72r of the detent spring 72 can be contacted at a predetermined pressure with the contact surfaces of the concavity portions 71c, 72d of the detent lever 71, thereby making it possible to smoothly move the roller 72r while the roller 72r is rotating on the contact surfaces of the concavity portions 71c, 72d.

The lock mechanism 53 is constructed to include a parking rod 81, a cam 82, a guide 83, a parking pawl 84, and a parking gear 85. The parking rod 81 is made of a rod-like member, and has one end portion 81a engaged with the engagement portion 71b of the detent lever 71, and the other end portion 81b axially movably supported by the guide 83.

The cam 82 is formed in a truncated conical shape, and has a conical cam surface 82a and a cylindrical lock surface 82b. The cam 82 further has a central portion formed with an axially extending through bore allowing the parking rod 81 to be received therein to have the cam 82 fastened to the parking rod 81. The cam 82 is engageable at the cam surface 82a and the lock surface 82b with the parking pawl 84.

The guide 83 is attached to the attaching portion, not shown, of the second housing 2H of the transaxle 3, and has a central portion formed with a through bore allowing the parking rod 81 to axially movably be received therein.

The parking pawl 84 has a cam engagement portion 84a engaged with the cam 82, a support portion 84b pivotably supported on the second housing 2H of the transaxle 3, and a meshing portion 84c meshable with the parking gear 85.

The parking pawl 84 is adapted to be pushed by the cam 82 to be pivoted around the center axis of the support portion 84b, and thus to have the meshing portion 84c meshed with the parking gear 85 when the detent lever 71 is pivoted to have the parking rod 81 moved toward the other end portion supported by the guide 83.

Figure 7:
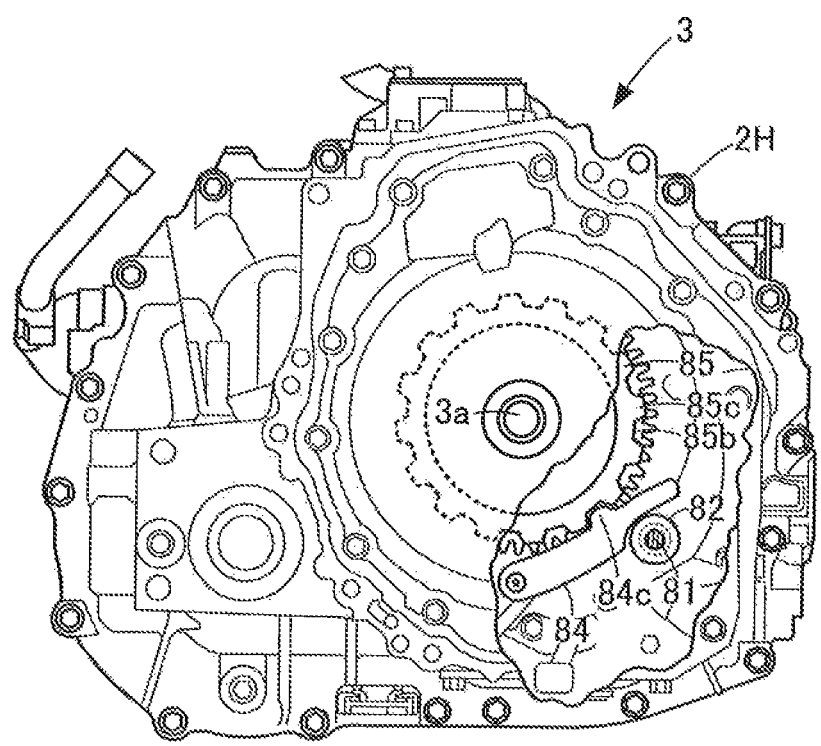
FIG. 7 is a side view of the partly cross-sectioned transaxle in which the parking lock apparatus according to the first embodiment of the present invention is assembled.

The parking gear 85 is, as shown in FIG. 7, connected with an output shaft 3a partly forming the transaxle 3 to output the power transmitted from the engine 2. The parking gear 85 has a gear 85a constructed to be rotated together with the output shaft 3a of the transaxle 3.

The gear 85a has a plurality of concavity portions 85b circumferentially equally spaced apart from one another to be meshed with the meshing portion 84c of the parking pawl 84, and a plurality of convex portions 85c each formed between the concavity portions 85b.

The electronic control unit 13 is constituted to include a CPU (Central Processing Unit), a ROM (Read Only Memory) for memorizing process programs and the like, a RAM (Random Access Memory) for temporally memorizing data, an EEPROM (Electrically Erasable and Programmable Read Only Memory), and input and output ports such as an A/D converter, a buffer and the like The electronic control unit 13 is electrically connected with a parking switch 4 and an electric actuator 11 as shown in FIG. 1. The electronic control unit 13 is adapted to be inputted with ON and OFF signals outputted from the parking switch 4. The electronic control unit 13 is constructed to be control the electric actuator 11 in accordance with the ON and OFF signals.

The fastening bolt 14 is constituted by a highly versatile screw bolt in compliance with a standard such as a HS standard, for example, by a hexagon bolt in compliance with JIS standard B1180.

Next, the switching operation of the parking lock apparatus 10 according to the first embodiment will simply be explained hereinafter.

Figure 8:
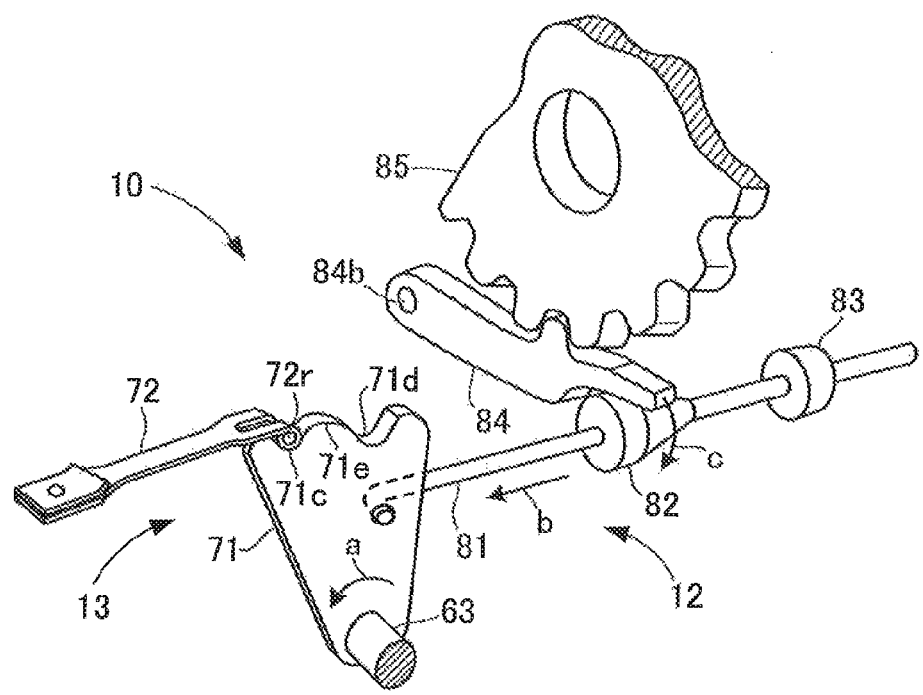
FIG. 8 is a partly exploded perspective view of the parking lock apparatus according to the first embodiment of the present invention and showing a parking lock maintained state.

FIG. 8 shows a parking lock maintained state in which the parking pawl 84 is meshed with the parking gear 85 to have the vehicle 1 maintained in the stoppage state. In the parking lock maintained state, the rotation of the output shaft 3a of the transaxle 3 is locked, thereby preventing the wheels not shown of the vehicle 1 from being rotated.

When, in this state, the parking switch 4 shown in FIG. 1 is operated to be released from being locked by the driver of the vehicle 1, the OFF signal of the parking switch 4 is outputted from the parking switch 4 to be inputted to the electronic control unit 13.

At this time, the command of the electronic control unit 13 causes the electric actuator 11 to be energized, so that the motor 22 of the electronic actuator 11 is rotated to have the rotor shaft 22c rotated, thereby rotating the power transmission shaft 61 of the transmission mechanism 51 as shown in FIG. 8. When the gear 62b is pivoted through the gear 62a of the power transmission shaft 61, the parking shaft 63 is pivoted to have the detent lever 71 pivoted in an arrow direction "a" in FIG. 8.

When the parking rod 81 is axially moved in an arrow direction "b" in FIG. 8, the parking pawl 84 is pivoted around the center axis of the support portion 84b in an arrow direction "c" in FIG. 8, so that the meshing portion 84c of the parking pawl 84 is brought out of meshing engagement of the gear 85a of the parking gear 85, thereby releasing the portion 84c from being meshed from the gear 85a.

Figure 9:
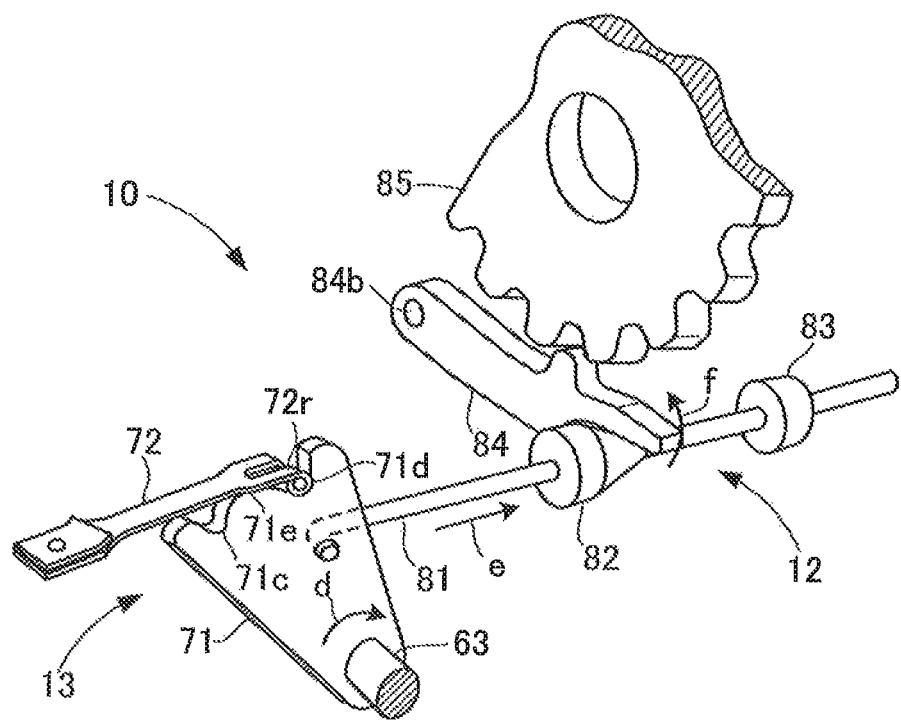
FIG. 9 is a partly exploded perspective view of the parking lock apparatus according to the first embodiment of the present invention and showing a parking lock released state.

At this time, the roller 72r of the detent spring 72 is moved from the engagement concavity portion 71c of the detent lever 71 to the engagement concavity portion 71d over the engagement convex portion 71e, thereby establishing the pivotal position of the detent lever 71 to the non-parking position as shown in FIG. 9. This means that the vehicle 1 is switched from the parking lock maintained state to the parking lock released state, thereby allowing the wheels to be rotated.

When, on the other hand, the parking switch 4 is pushed as shown in FIG. 1 by the driver of the vehicle 1 in the parking lock released state of the vehicle 1, the ON signal of the parking switch 4 is inputted to the electronic control unit 13.

At this time, the command of the electronic control unit 13 causes the electric actuator 11 to be energized, so that the motor 22 of the electronic actuator 11 is rotated to have the rotor shaft 22c rotated, thereby rotating the power transmission shaft 61 of the transmission mechanism 51 as shown in FIG. 9. When the gear 62b is pivoted through the gear 62a of the power transmission shaft 61, the parking shaft 63 is pivoted to have the detent lever 71 pivoted in an arrow direction "e" in FIG. 8.

When the parking rod 81 is axially moved in an arrow direction "e" in FIG. 8, the parking pawl 84 is pivoted around the center axis of the support portion 84b in an arrow direction "f" in FIG. 9, so that the meshing portion 84c of the parking pawl 84 is brought into meshing engagement of the gear 85a of the parking gear 85, thereby releasing the portion 84c from being meshed from the gear 85a.

At this time, the roller 72r of the detent spring 72 is moved from the engagement concavity portion 71d of the detent lever 71 to the engagement concavity portion 71c over the engagement convex portion 71e, thereby establishing the pivotal position of the detent lever 71 to the parking position as shown in FIG. 8. This means that the vehicle 1 is switched from the parking lock released state to the parking lock maintained state, thereby allowing the wheels to be prevented from be rotated.

The parking lock apparatus 10 according to the first embodiment as previously constructed can obtain the following advantageous effects.

More specifically, the parking lock apparatus 10 according to the first embodiment comprises an electric actuator 11 and a parking lock mechanism 12, the actuator 11 being constituted by a DC motor to be operated in response to the shift operation, while the parking lock mechanism 12 being operative to selectively take a parking lock maintained state in which the vehicle 1 is maintained in the stoppage state or a parking released state in which the vehicle 1 is released from the stoppage state.

The electric actuator 11 is disposed in a space 1k between the inner wall portion 1Ha of the first housing 1H partly forming the engine 2 and the inner wall portion 2Ha of the extension portion 41c of the second housing 2H partly forming the transaxle 3, and fastened by fastening bolts 14 on the transaxle housing cover 42 of the second housing 2H.

The parking lock mechanism 12 comprises a switching mechanism 52, a transmission mechanism 51, and a lock mechanism 53. The switching mechanism 52 is operative to be switched to selectively take a parking position corresponding to the parking lock maintained state and a non-parking position corresponding to the parking lock released state. The transmission mechanism 51 is adapted to transmit the operation of the electric actuator 11 to the switching mechanism 52. The lock mechanism 53 is adapted to lock the power from being outputted from the transaxle 3 when the switching mechanism 52 is switched to take the parking position.

As a consequence, the parking lock apparatus 10 according to the first embodiment can obtain such an advantageous effect that the electric actuator 11 and the parking lock mechanism 12 cannot be accessed from the outside of the vehicle 1, resulting from the fact that the electric actuator 11 is disposed in a space 1k between the first housing 1H and the extension portion 41c of the second housing 2H.

In contrast, the conventional parking lock mechanism mount on the vehicle is constructed to have an electric actuator disposed in the housing, so that the electric actuator 11 and the parking lock mechanism 12 can easily be accessed from the outside of the vehicle 1, thereby causing a possibility that the electric actuator 11 and the parking lock mechanism 12 can be removed, or otherwise the electric actuator is arbitrarily or maliciously operated. On the other hand, the parking lock apparatus 10 according to the first embodiment is constructed with the electric actuator 11 which cannot be accessed from the outside of the vehicle 1, thereby resulting in the fact that there is no possibility that the function of the parking lock mechanism is lowered, thereby making it possible to enhance the reliability of the parking lock apparatus 10.

Therefore, the electric actuator 11 and the parking lock mechanism 12 cannot be accessed from the outside of the vehicle 1 and thus cannot be contacted by someone, so that the electric actuator 11 and the parking lock mechanism 12 are not required to be strengthened or increased in mechanical strength nor to use special fastening bolts for fastening the electric actuator 11 to the vehicle 1. Another advantageous effect is such that the electric actuator 11 is not required to be constituted by a SR motor relatively expensive and not operated only with energization.

As a consequence, the parking lock apparatus 10 according to the first embodiment can use not only a DC motor relatively inexpensive and having a high accuracy but inexpensive bolts in compliance with the standard now in use, thereby making it possible to remarkably reduce the production cost as compared with the conventional parking lock apparatuses.

Further, the parking lock mechanism 12 in the first embodiment is provided with the transmission mechanism 51, the switching mechanism 52 and the lock mechanism 53, so that the parking lock maintained state and the parking released state can be promptly reliably switched by the operation of the driver in the similar manner to the conventional parking apparatus.

Second Embodiment

Figure 10:
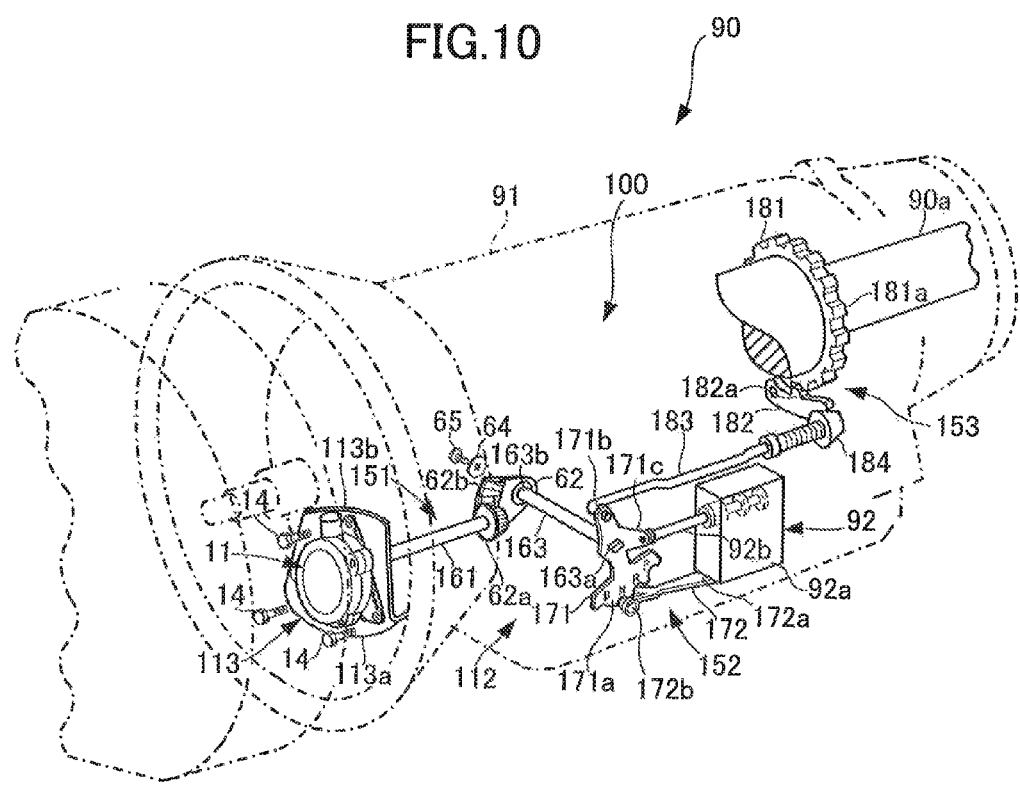
FIG. 10 is a perspective view of a transmission and the parking lock apparatus in which the parking lock apparatus according to the second embodiment of the present invention is assembled.

FIG. 10 shows a second embodiment of the parking lock apparatus according to the present invention. The explanation of the second embodiment will be omitted hereinafter about the constitution parts and elements forming the second embodiment the same as those of the first embodiment, but bearing the same reference numerals as those of the first embodiment in FIG. 10.

The parking lock apparatus 100 according to the second embodiment is applied to the automatic transmission 90 of the vehicle as shown in FIG. 10.

The parking lock apparatus 100 is, as shown in FIG. 10, provided in the automatic transmission 90 operatively connected with the engine 2 of the vehicle 1, and constructed to have the rotation of the output shaft 90a of the automatic transmission 90 selectively locked or unlocked in response to the shift operation conducted by the driver of the vehicle.

This means that, similarly to the first embodiment, the parking lock apparatus is constructed to be capable of selectively taking a parking lock maintained state to have the stoppage state of the vehicle maintained or a parking lock released state to have the stoppage state of the vehicle released. The above automatic transmission 90 constitutes the power transmission apparatus defined in the present invention.

The automatic transmission 90 is constituted to include a case 91 constituting the housing and a parking lock apparatus 100 adapted to selectively lock or unlock the rotation of the output shaft 90a of the automatic transmission 90 at the stoppage time of the vehicle, a transmission mechanism not shown in the drawings but forming speed change stages of the vehicle in travelling, and a hydraulic control apparatus 92 for hydraulically controlling the transmission mechanism.

Similarly to the first embodiment, the parking lock apparatus 100 is constituted by what is called a shift-by-wire type of shift control system which can detect a driver's shift operation input with sensors or switches to select a shift position in response to a detected signal, so that the parking lock apparatus 100 can switch the shill positions including a parking position and non-parking positions excluding the parking position, viz., one or more drive positions (D), a neutral position (N), and a reverse position (R) in a different manner from the first embodiment.

The construction of the parking lock apparatus 100 according to the second embodiment will be explained in detail hereinafter.

The parking lock apparatus 100 is constructed to include an electric actuator 11, a parking lock mechanism 112, a bracket 113 serving as a support portion for supporting the electric actuator 11 on the automatic transmission 90, an electronic control unit not shown in the drawings to control the electric actuator 11, and fastening bolts 14 for securing the electric actuator 11 to the bracket 113.

The electric actuator 11 and the parking lock mechanism 112 in the second embodiment constitute in combination a parking lock apparatus defined in the present invention.

The electric actuator 11 is disposed between a space surrounded by the inner wall portion of a first housing 1H partly constituting the engine 2 and the inner wall portion of a second housing 2H partly forming the automatic transmission 90.

The parking lock mechanism 112 is constituted to include a transmission mechanism 151, a switching mechanism 152, and a lock mechanism 153.

The transmission mechanism 151 is constituted to include a power transmission shaft 161 connected with the electric actuator 11, a gear module 62 for transmitting the power between the two shafts respectively having center axes perpendicular to each other, a parking shaft 163 connected with the gear module 62, and a washer 64 and a screw 65 for fastening the gear module 62 to the parking shaft 163. Similarly to the first embodiment, the transmission mechanism 151 is adapted to transmit the operation of the electric actuator 11, viz., the power outputted from the electric actuator 11 to the switching mechanism 152 by converting the power on the same plane but in the perpendicular direction.

The power transmission shaft 161 has one end portion formed with an outer spline gear to be held in spline engagement with the rotor shaft 22c of the electric actuator 11, and the other end portion connected with the gear module 62.

The parking shaft 163 has one end portion 163a connected with the switching mechanism 152 and the other end portion 163b connected with the large diameter side gear 62b of the module 62. The one end portion 163a of the parking shaft 163 is coupled with the switching mechanism 152, so that the parking shaft 163 can be rotated together with the switching mechanism 152. The other end portion 163b of the parking shaft 163 is formed with a screw hole axially extending, and an outer spline teeth held in spline engagement with the inner spline teeth formed in the through bore 62c of the gear 62b of the gear module 62, so that the other end portion 163b of the parking shaft 163 is secured to the gear 62b of the gear module 62.

The parking shaft 163 is rotatably supported on the case 91 of the automatic transmission 90 through a bearing not shown in the drawings.

The switching mechanism 152 comprises a detent lever 171, and a detent spring 172. The switching mechanism 152 is constructed to be switched to selectively take a parking position (P) or non-parking positions in response to the operation of the shift lever by the driver.

The non-parking positions include for example a reverse position (R), a neutral position (N), and one or more drive positions (D). In order to establish the speed change stages respectively corresponding to the positions in response to the operation of the shift lever by the driver, the manual valve 92a provided in the hydraulic apparatus 92 is adapted to be operated.

The detent lever 171 has one end side 171a formed with concavity portions respectively corresponding to the parking position (P), the reverse position (R), the neutral position (N), and the drive positions (D) to be selected by the shift lever. The detent lever 171 has the other end side 171b connected with the one end portion of the lock mechanism 153, and an projection portion 171e connected with the end portion of a spool 92b forming part of the manual valve 92a.

The detent lever 171 is integrally rotatably connected with the one end of the parking shaft 163, and is pivoted at four stages when the parking shaft 163 is pivoted in response to the positions selected by the shift lever among the parking position (P), the reverse position (R), the neutral position (N), and the drive positions (D). The detent lever 171 is adapted to axially move the spool 92b of the manual valve 92a in response to the pivotal movement of the detent lever 171.

The detent spring 172 is constituted to include an attaching portion 172a attached to the manual valve 92a of the hydraulic apparatus 92, and a roller portion 172b engageable with the concavity portions of the detent lever 171.

The pivotal position of the detent lever 171 is established with any one of the concavity portions of the detent lever 171 being engaged with the roller portion 172b. In other words, any one of the positions among the parking position (P), the reverse position (R), the neutral position (N), and the drive positions (D) can be determined with the roller portion 172b being engaged with any one of the concavity portions of the detent lever 171.

The lock mechanism 153 is constituted to include a parking gear 181, a parking pawl 182, and a parking rod 183. The lock mechanism 153 is operative to prevent the output shaft 90a of the automatic transmission 90 from being rotated to have the stoppage stage of the vehicle maintained in response to the operation of the shift lever by the driver to select the parking range.

The parking gear 181 is connected with the output shaft 90a of the automatic transmission 90 with no relative rotation therebetween, and thus is rotatable together with the output shaft 90a. The parking gear 181 has an outer peripheral portion formed with a plurality of teeth 181a.

The parking pawl 182 is formed at its position facing the outer surface of the parking gear 181 with an engagement portion 182a engageable with one of the teeth 181a of the parking gear 181. The engagement portion 182a of the parking pawl 182 is constructed to selectively be engaged with or disengaged from the teeth 181a of the parking gear 181. The parking pawl 182 has one end portion rotatably connected with the case 91 of the automatic transmission 90, and thus is pivotable around the one end portion serving as a fulcrum to move toward and away from the parking gear 181.

The parking rod 183 has one end portion connected with the switching mechanism 152 and the other end portion on which a parking cam 184 in a truncated cone shape is securely mounted. The parking rod 183 is supported on the support portion, not shown, of the case 91 to axially be slidable in response to the pivotal movement of the switching mechanism 152.

The parking rod 183 is axially moved to press the parking can 184 toward the parking pawl 182 in response to the pivotal movement of the switching mechanism 152, thereby causing the parking pawl 182 to be pivoted toward the parking gear 181 to have the engagement portion 182a of the parking pawl engaged with one of the teeth 181a of the parking gear 181.

The bracket 113 has an attaching portion 113a attached to the second housing 2H of the automatic transmission 90, and a fastening portion 113b to which the electric actuator 11 is fastened by fastening bolts 14.

Next, the switching operation of the parking lock apparatus 100 according to the first embodiment will simply be explained hereinafter.

When the shift operation is performed by the driver of the vehicle for example with the shift lever being selected to the reverse position (R) in the parking lock maintained state in which the wheels are prevented from being rotated, a shift position sensor not shown is operative to output an electric signal indicative of the shift lever being selected to the reverse position (R) to the electronic control unit.

At this time, the command signal of the electronic control unit causes the electric actuator 11 to be energized, thereby rotating the motor 22 of the electric actuator 11, the rotor shaft 22c, and the power transmission shaft 161 of the transmission mechanism 151. When the gear 62b is rotated through the gear 62a of the power transmission shaft 161, the parking shaft 163 is rotated to have the detent lever 171 pivoted.

In response to the axial movement of the parking rod 183 toward the detent lever 171, the parking pawl 182 is pivoted, so that the engagement portion 182a of the parking pawl 182 is spaced apart from the teeth 181a of the parking gear 181 to release the parking lock maintained state.

At this time, the roller portion 172b of the detent spring 172 is brought into engagement with the concavity portion corresponding to the reverse position (R) of the detent lever 171, thereby establishing the reverse position (R) with the pivotal position of the detent lever 171 thus moved. This means that the vehicle is switched to the reverse position (R) from the parking lock maintained state, so that the automatic transmission 90 is switched into the reverse speed change stage, thereby bringing the vehicle into the backward movement state in which the vehicle can move backwardly.

In the case that the shift lever is operative to select the positions other than the reverse position (R) with the shift operation by the driver of the vehicle, the parking lock apparatus 100 is operated similarly to the selection operation of the reverse position (R).

For example at the time of selecting any one of the parking position (P), the neutral position (N), and the drive positions (D), the shift position sensor is also operative to output an electric signal indicative of the shift lever being selected to the predetermined position to the electronic control unit.

The electronic control unit is operative to energize the electric actuator 11 in accordance with the electric signal, and thereby to drive the electric actuator 11 at the predetermined rotational speed (rpm) in the predetermined direction. The electric actuator 11 thus driven makes it possible to establish the rotation position of the detent lever 171 at a predetermined position, so that the automatic transmission 90 is switched to the predetermined speed change stage through the spool 92b of the hydraulic control apparatus 92, thereby bringing the vehicle into the travelling state in which the vehicle can travel at a predetermined speed change ratio.

The parking lock apparatus 100 according to the second embodiment is constructed as previously mentioned, so that the following advantageous effects can be obtained.

The parking lock apparatus 100 according to the second embodiment comprises the electric actuator 11 constituted by the DC motor operative in response to the shift operation, and the parking lock mechanism 112 driven by the electric actuator 11 and operative to be switched to selectively take the parking lock maintained state in which the vehicle is maintained in the stoppage state or the parking lock released state in which the vehicle is released from the stoppage state, as well as to have the predetermined speed change stage switched.

The electric actuator 11 is disposed in the space between the inner wall portion of the first housing 1H partly constituting the engine 2 and the inner wall portion of the case partly forming the automatic transmission 90, and supported on the bracket 113 attached to the case 91, and secured to the bracket 113 by the fastening bolts 14.

The parking lock mechanism 112 comprises the switching mechanism 152, the transmission mechanism 151, and the lock mechanism 153. The switching mechanism 152 is operative to be switched to selectively take the position corresponding to the parking lock maintained state or the positions respectively corresponding to the predetermined speed change states in the parking lock released state. The transmission mechanism 151 is operative to transmit the operation of the electric actuator 11 to the switching mechanism 152. The lock mechanism 153 is operative to lock the power from being outputted from the automatic transmission 90 when the switching mechanism 152 is switched to the parking position.

As a consequence, the parking lock apparatus 100 according to the second embodiment is constructed to have the electric actuator 11 disposed in the space between the first housing 1H and the case 91, thereby making it possible to obtain such an advantage effect that the electric actuator 11 and the parking lock mechanism 112 cannot be accessed from the outside of the vehicle in the similar manner to the first embodiment.

In the vehicle having a conventional parking lock mechanism mounted thereon, the electric actuator is disposed in the outside of the housing, so that there is a possibility that the electric actuator and the parking lock mechanism can easily be accessed and thus can be removed from the outside of the vehicle, or otherwise the electric actuator can arbitrarily be manipulated. In contrast, the parking lock apparatus 100 according to the second embodiment is constructed to have the electric actuator 11 completely not manipulated from the outside of the vehicle, thereby making it possible obtain such an advantageous effect that the parking lock apparatus 100 can prevent the function of the electric actuator from being lowered as well as to improve the reliability of the parking lock apparatus 100.

Therefore, the electric actuator 11 and the parking lock mechanism 112 cannot be accessed from the outside of the vehicle, so that there is no need to firmly fasten the electric actuator 11 and the parking lock mechanism 112 to the housing or by using special fastening bolts to fasten the electric actuator to the housing. In addition, the electric actuator is not required to be constructed by a relatively expensive SR motor which is not operated only with the energization.

As a result, it is possible to use a DC motor relatively inexpensive and high in accuracy and fastening bolts inexpensive in compliance with the standard, so that the parking lock apparatus 100 according to the second embodiment can obtain such an advantageous effect that the parking lock apparatus can remarkably reduce the production cost as compared with the conventional parking lock apparatus.

The parking lock mechanism 112 provided, with the switching mechanism 152, the transmission mechanism 151, and the lock mechanism 153 constructed as previously mentioned can promptly and reliably be switched by the operation of the driver to selectively take the parking lock maintained state or the predetermined speed change stages in the parking lock released state in the similar manner to the conventional parking lock apparatus.

Third Embodiment

Figure 11:
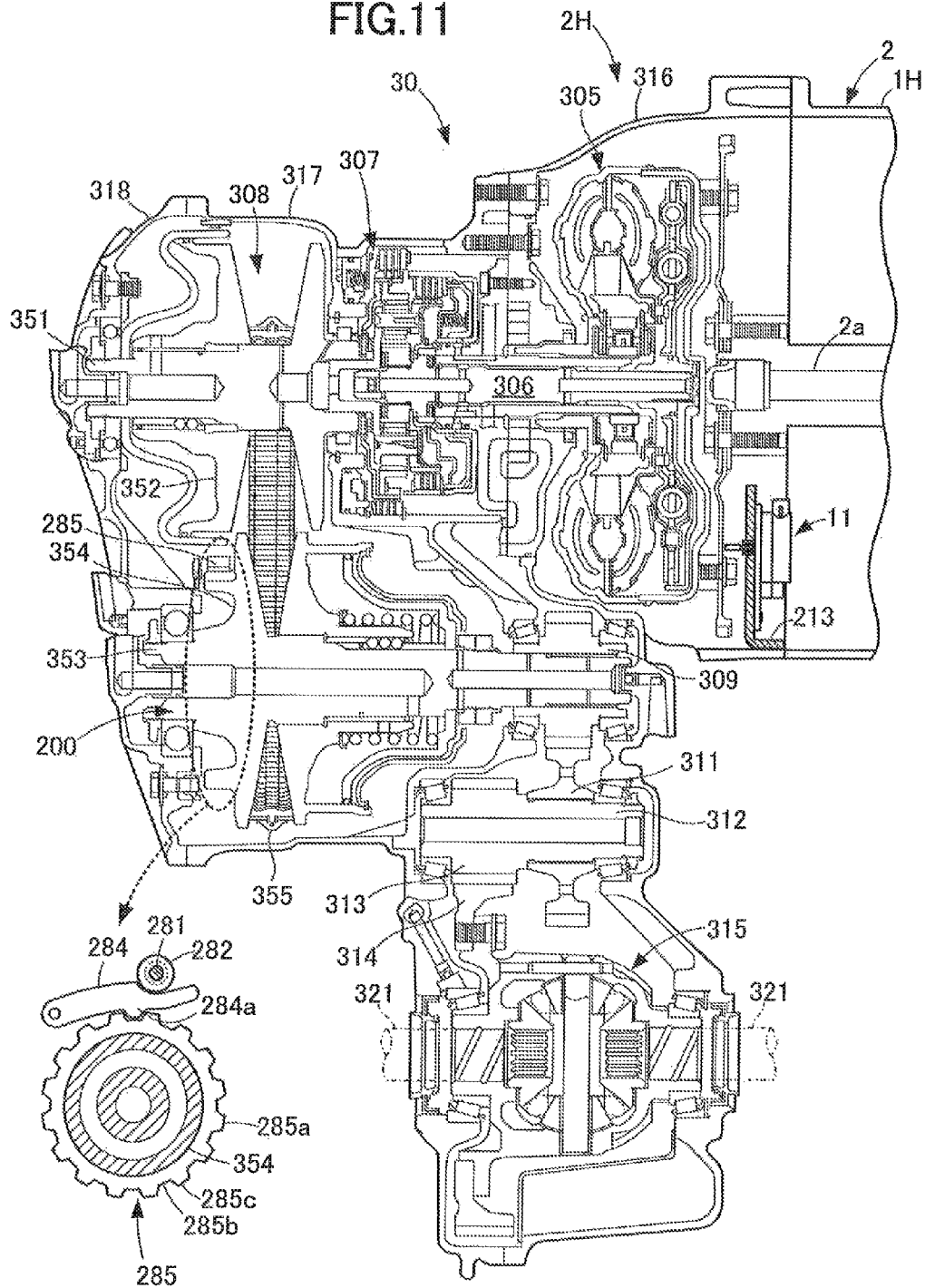
FIG. 11 is a cross-sectional view of a transaxle in which the parking lock apparatus according to the third embodiment of the present invention is assembled.

FIGS. 11, 12 show a third embodiment of the parking lock apparatus according to the present invention. The explanation of the third embodiment will be omitted hereinafter about the constitution parts and elements forming the third embodiment the same as those of the first embodiment, but bearing the same reference numerals as those of the first embodiment in FIGS. 11, 12.

The parking lock apparatus 200 according to the second embodiment is provided in a transaxle 30 constituted by a continuously variable transmission (hereinafter simply referred to as a CVT), and connected with the engine 2 of the vehicle.

The parking lock apparatus 200 is constructed to selectively lock, or unlock the rotation of the output shaft of the transaxle 30 in response to the shift operation of the driver of the vehicle similarly to the first embodiment. More specifically, the parking lock apparatus 200 is constructed to selectively take a parking lock maintained state in which the vehicle is maintained in the stoppage or a parking lock released state in which the vehicle is released from the stoppage.

The construction of the transaxle 30 to which the parking lock apparatus 200 is applied will simply be explained hereinafter.

The transaxle 30 is constituted to include a torque convertor 305 connected with a crankshaft 2a forming part of the engine 2, a forward-reverse switching mechanism 307 connected with the torque convertor 305 through an input shaft 306, and a CVT 308 connected with the forward-reverse switching mechanism 307.

The transaxle 30 is constituted to include a counter drive gear 309 connected with the CVT 308, a counter driven gear 311 held in mesh with the counter drive gear 309, an intermediate shaft 312 for supporting the counter driven gear 311, a final drive gear 313 supported on the intermediate shaft 312, a ring gear 314 held in mesh with the final drive gear 313, and a differential 315 connected with the ring gear 314.

The transaxle 30 is constituted to further include a second housing 2H for accommodating therein the above constitution elements, left and right front drive shafts 321 connected with the differential 315, and left and right front wheels respectively connected with front drive shafts 321. The second housing 2H is constituted by a transaxle housing 316, a transaxle case 317, and a transaxle cover 318.

The engine 2 constitutes the power generation apparatus defined in the present invention, while the transaxle 30 constitutes the power transmission apparatus defined in the present invention.

The CVT 308 is constituted to include a primary shaft 351 extending in axial alignment with the input shaft 306, a primary pulley 352 supported on the primary shaft 351, a secondary shaft 353 extending in parallel with the primary shaft 351 to serve as an output shaft, a secondary pulley 354 supported on the secondary shaft 353, and a transmission belt 355.

Similarly to the parking lock apparatus 10 according to the first embodiment, the parking lock apparatus 200 partly constitutes what is called a shift-by-wire control system which is operative to detect the operation of the shift lever by the driver with sensors and switches to select the shift positions respectively established in response to the electric signals detected by the sensors and the switches, thereby making it possible for the parking lock apparatus 200 to be switched to selectively take a parking position or shift positions, viz., the non-parking positions other than the parking positions.

The parking lock apparatus 200 is, similarly to the first embodiment, constructed to be switched to take the parking position in which the output shaft of the transaxle 30 is locked to have the vehicle maintained in the parking lock maintained state when the parking switch is operated by the driver of the vehicle into the ON state. This means that the parking lock apparatus 200 is also constructed to selectively take the parking lock maintained state in which the vehicle is maintained in the stoppage state or the parking lock released state in which the vehicle is released from the stoppage state.

The construction of the parking lock apparatus 200 according to the third embodiment will be explained hereinafter.

The parking lock apparatus 200 is, as shown in FIGS. 11, 12, constituted to include an electric actuator 11, a parking lock mechanism 212, an electronic control unit not shown for controlling the electric actuator 11, a bracket 213 serving as a support portion for having the electric actuator 11 supported on the transaxle 30, and fastening bolts 14 for fastening the electric actuator 11 to the bracket 213.

The electric actuator 11 and the parking lock mechanism 212 in the third embodiment constitute in combination the parking lock apparatus according to the present invention.

The electric actuator 11 is disposed in the space surrounded by the inner wall portion of the first housing 1H supported on the bracket 213 and partly forming engine 2 and the inner wall portion of the second housing 211 partly forming the transaxle 30.

The parking lock mechanism 212 is constituted to include a transmission mechanism 251, a switching mechanism 252, and a lock mechanism 253.

The transmission mechanism 251 is constituted to include a power transmission shaft 261 connected with the electric actuator 11, a gear module 62 for transmitting the power between the two shafts respectively having center axes perpendicular to each other, a parking shaft 263 connected with the gear module 62, and a washer 64 and a screw 65 for fastening the gear module 62 to the parking shaft 263. The transmission mechanism 251 is, similarly to the first embodiment, adapted to transmit the operation of the electric actuator 11, viz., the power outputted from the electric actuator 11 to the switching mechanism 252 by converting the power on the same plane but in the perpendicular direction.

The power transmission shaft 261 has one end portion formed with an outer spline gear to be held in spline engagement with the rotor shaft 22c of the electric actuator 11, and the other end portion connected with the gear module 62.

Similarly to the first embodiment, the parking shaft 263 has one end portion. 263a connected with the switching mechanism 252 and the other end portion 263b connected with the large diameter side gear 62b of the gear module 62. The one end portion 263a of the parking shaft 263 is coupled with the switching mechanism 252, so that the parking shaft 263 can be rotated together with the switching mechanism 252. The other end portion 263b of the parking shaft 263 is formed with a screw hole 263c axially extending, and an outer spline teeth 263d held in spline engagement with the inner spline teeth formed in the through bore 62c of the gear 62b of the gear module 62, so that the other end portion 263b of the parking shaft 263 is secured by the screw 65 to the gear 62b of the gear module 62.

The parking shaft 263 is rotatably supported on the second housing 2H of the transaxle 30 through a bearing not shown in the drawings.

The switching mechanism 252 comprises a detent lever 271, a detent spring 272, a spring retainer 273, and an attaching bolt 274. The switching mechanism 252 is, similarly to the first embodiment, constructed to be switched to selectively take a parking position corresponding to the parking lock maintained state in which the vehicle is maintained in the stoppage or non-parking positions corresponding to the parking lock released state in which the vehicle is released from the stoppage.

The detent lever 271 has a connection portion 271a, an engagement portion 271b, engagement concavity portions 271c, 271d, and an engagement convex portion 271e formed between the engagement concavity portions 271c and 271d. The connection portion 271a of the detent lever 271 is connected with the parking shaft 263, so that the detent lever 271 is pivoted together with the parking shat 263.

The engagement portion 271b of the detent lever 271 is formed with a through bore allowing the part of the lock mechanism 253 to relatively rotatably be engaged therewith. In response to the pivotal movement of the detent lever 271 around the center axis of the connection portion 271a, the lock mechanism 253 is moved by the engagement portion 271b in response to the pivotal angle of the detent lever 271.

The engagement concavity portion 271c is adapted to be engaged with the part of the detent spring 272, thereby making it possible for the parking position to be determined with the pivotal position taken by the detent lever 271 when the engagement concavity portion 271c is engaged with the part of the detent spring 272, so that the vehicle can be switched to take the parking lock maintained state.

On the other hand, the engagement concavity portion 271d is also adapted to be engaged with the part of the detent spring 272, thereby making it possible for the parking position to be determined with the pivotal position taken by the detent lever 271 when the engagement concavity portion 271d is engaged with the part of the detent spring 272, so that the vehicle can be switched to take the parking lock released state.

The detent spring 272 is, similarly to the first embodiment, constructed to have a body 272a, an attaching portion 272b, and a roller portion 272c to have the roller portion 272c engaged with the engagement concavity portion 271c, 271d at a predetermined contact pressure (N) when the roller 272c is positioned at the engagement concavity portion 271c, 271d.

The body 272a of the detent spring 272 is constructed by a plate spring made of a resilient material, and has one end portion serving as the attaching portion 272b and the other end portion rotatably supporting the roller portion 272c.

The attaching portion 272b of the detent spring 272 is formed with a through bore allowing attaching bolt 274 to be received, so that the detent spring 272 and the spring retainer 273 to the second housing 2H of the transaxle 30 can be fastened by the attaching bolt 274.

The roller portion 272c has a roller 272r, a support shaft 272s for rotatably supporting the roller 272r, and a support portion 272u for supporting the both axial end portions of the support shaft 272s.

The spring retainer 2.73 serves to retain the attaching portion 272b of the detent spring 272 to the transaxle 3, and to prevent the excessive deformation of the body 272a of the detent spring 272 when the body 272a of the detent spring 272 is resiliently deformed.

With the above construction of the detent lever 271 and the detent spring 272, the roller 272r of the detent spring 272 can be contacted at a predetermined pressure with the contact surfaces of the concavity portions 271c, 272d of the detent lever 271, thereby making it possible to smoothly move the roller 272r while the roller 272r is rotating on the contact surfaces of the concavity portions 271c, 272d.

The lock mechanism 253 is, similarly to the first embodiment, constructed to include a parking rod 281, a cam 282, a guide 283, a parking pawl 284, and a parking gear 285.

The parking rod 281 is made of a rod-like member, and has one end portion 281a engaged with the engagement portion 271b of the detent lever 271, and the other end portion 281b axially movably supported by the guide 283.

The cam 282 is formed in a truncated conical shape, and has a conical cam surface 282a and a cylindrical lock surface 282b. The cam 282 further has a central portion formed with an axially extending through bore allowing the parking rod 281 to be received therein to have the cam 282 fastened to the parking rod 281. The cam 282 is engageable at the cam surface 282a and the lock surface 282b with the parking pawl 284.

The guide 283 is attached to the attaching portion, not shown, of the second housing 2H of the transaxle 30, and has a central portion formed with a through bore allowing the parking rod 281 to axially movably be received therein.

The parking pawl 284 has a cam engagement portion 284a engaged with the cam 282, a support portion 284b pivotably supported on the second housing 2H of the transaxle 30, and a meshing portion 284c meshable with the parking gear 285.

The parking pawl 284 is adapted to be pushed by the cam 282 to be pivoted around the center axis of the support portion 284b, and thus to have the meshing portion 284c meshed with the parking gear 285 when the detent lever 271 is pivoted to have the parking rod 281 moved toward the other end portion supported by the guide 283.

The parking gear 285 is securely mounted on a secondary pulley 354 forming part of the transaxle 30 to output the power transmitted from the engine 2. The parking gear 285 is formed with teeth 285a, and adapted to be rotated together with the secondary pulley 354.

The teeth 285a of the parking gear 285 are constituted by a plurality of concavity portions 285b and a plurality of convex portions 285c circumferentially equally spaced apart from one another to be engageable with the meshing engagement portion 284c of the parking pawl 284.

Next, the switching operation of the parking lock apparatus according to the third embodiment will simply be explained hereinafter.

When the shift operation is performed by the driver of the vehicle for example with the parking switch being operated to release the parking lock in the parking lock maintained state in which the wheels are prevented from being rotated, an electric signal indicative of the parking switch being in the OFF state is outputted to the electronic control unit.

At this time, the command signal of the electronic control unit causes the electric actuator 11 to be energized, thereby rotating the motor 22 of the electric actuator 11, the rotor shaft 22c, and the power transmission shaft 261 of the transmission mechanism 251. When the gear 62b is rotated through the gear 62a of the power transmission shaft 161, the parking shaft 263 is rotated to have the detent lever 271 pivoted. When the parking rod 281 is axially moved toward the parking shaft 263, the parking pawl 284 is pivoted around the center axis of the support portion 284b to have the meshing engagement portion 284c of the parking pawl 284 moved away from the teeth 285a of the parking gear 285, thereby releasing the meshing engagement portion 284c from the teeth 285a of the parking gear 285.

At this time, the roller 272r of the detent spring 272 is moved from the engagement concavity portion 271c of the detent lever 271 to the engagement concavity portion 271d over the engagement convex portion 271e, and thus brought into engagement with the engagement concavity portion 271d, thereby establishing the pivotal position of the detent lever 271 to the non-parking position. This means that the vehicle 1 is switched from the parking lock maintained state to the parking lock released state, thereby allowing the wheels to be rotated.

When, on the other hand, the parking switch is pushed by the driver of the vehicle 1 in the parking lock released state of the vehicle 1, the ON signal of the parking switch is inputted to the electronic control unit.

At this time, the command of the electronic control unit causes the electric actuator 11 to be energized, so that the motor 22 of the electronic actuator 11 is rotated to have the rotor shaft 22c rotated, thereby rotating the power transmission shaft 261 of the transmission mechanism 251. When the gear 62b is pivoted through the gear 62a of the power transmission shaft 261, the parking shaft 263 is pivoted to have the detent lever 271 pivoted.

When the parking rod 28a is moved away from the parking shaft 263, the parking pawl 284 is pivoted around the center axis of the support portion 284b to have the meshing engagement portion 284c of the parking pawl 284 brought into meshing engagement with the teeth 285a of the parking gear 285.

At this time, the roller 272r of the detent spring 272 is moved from the engagement concavity portion 271d of the detent lever 271 to the engagement concavity portion 271c over the engagement convex portion 271e, and thus brought into engagement with the engagement concavity portion 271c, thereby establishing the pivotal position of the detent lever 271 to the parking position. This means that the vehicle 1 is switched from the parking lock released state to the parking lock maintained state, thereby preventing the wheels from being rotated.

The parking lock apparatus 200 according to the third embodiment is constructed as previously mentioned, and thus can obtain the following advantageous effects.

More specifically, the parking lock apparatus 200 according to the third embodiment comprises the electric actuator 11 constituted by the DC motor operated in response to the shift operation, and the parking lock mechanism 212 driven by the electric actuator 11 to selectively take the parking lock maintained state in which the vehicle is maintained in the stoppage state or the parking lock released state in which the vehicle is released from the stoppage state.

The above actuator 11 is disposed in the space between the inner wall portion of the first housing 1H partly constituting the engine 2 and the inner wall portion of the second housing 2H partly constituting the transaxle 30, and fastened by the fastening bolts 14 to the bracket 213 securely mounted on the transaxle housing 316 of the second housing 2H.

The parking lock mechanism 212 is constituted to include the transmission mechanism 251, the switching mechanism 252, and the lock mechanism 253. The switching mechanism 252 is constructed to be switched to selectively take the parking position corresponding to the parking lock maintained state to maintain the stoppage of the vehicle 1 or the non-parking position corresponding to the parking released state to release the stoppage of the vehicle 1. The transmission mechanism 251 is adapted to transmit the operation of the electric actuator 11 to the switching mechanism 252. The lock mechanism 253 is adapted to lock the power from being outputted from the transaxle 30 when the switching mechanism is switched to take the parking position.

As a consequence, the parking lock apparatus 200 according to the third embodiment can also obtain such an advantageous effect that the electric actuator 11 and the parking lock mechanism 212 cannot be accessed from the outside of the vehicle, resulting from the fact that the electric actuator 11 is disposed in the space between the first housing 1H and the second housing 2H.

The vehicle having a conventional parking lock apparatus mounted thereon is constructed to have an actuator disposed outside of the housing, so that the electric actuator and the parking lock mechanism can easily be removed and manipulated from the outside of the vehicle, thereby leading to a possibility that the vehicle can be in the state that the vehicle can be moved.

In contrast, the parking lock apparatus 200 according to the third embodiment has no possibility that the parking lock apparatus is lowered in function, thereby making it possible to obtain an effect to improve the reliability of the parking lock apparatus.

Therefore, the electric actuator 11 and the parking lock mechanism 12 cannot be accessed from the outside of the vehicle 1 and thus cannot be contacted by someone, so that the electric actuator 11 and the parking lock mechanism 12 are not required to be reinforced or increased in mechanical strength nor to use special fastening bolts for fastening the electric actuator 11 to the vehicle 1. Another advantageous effect is such that the electric actuator 11 is not required to be constituted by an SR motor relatively expensive and not operated only with energization.

As a result, it is possible to use a DC motor relatively inexpensive and high in accuracy and fastening bolts inexpensive in compliance with the standard, so that the parking lock apparatus 200 according to the third embodiment can obtain such an advantageous effect that the parking lock apparatus 200 can remarkably reduce the production cost as compared with the conventional parking lock apparatus.

The parking lock mechanism 212 provided with the transmission mechanism 251, the switching mechanism 252, and the lock mechanism 253 constructed as previously mentioned can promptly and reliably be switched by the operation of the driver to selectively take the parking lock maintained state or the predetermined speed change stages in the parking lock released state in the similar manner to the conventional parking lock apparatus.

The parking lock apparatuses 10, 100, 200 according to the first to third embodiments have been explained each with the electric actuator disposed in the space between the first housing 1H and the second housing 2H.

However, the parking lock apparatus according to the present invention may be constructed to have the electric actuator disposed in the space other than the space between the first housing 1H and the second housing 2H. For example, the parking lock apparatus according to the present invention may be constructed to have the electric actuator disposed in the space formed only by the second housing 2H in the neighborhood of the parking lock mechanism, or otherwise only by the first housing 1H partly forming the engine.

Both of the parking lock apparatuses previously mentioned are constructed each having the electric actuator and the parking lock mechanism which cannot be accessed from the outside of the vehicle, so that the parking lock apparatus has no possibility to be lowered in function, resulting from the access to the parking lock apparatus, thereby making it possible to improve the reliability of the parking lock apparatus.

The parking lock apparatuses 10, 100, 200 according to the first to third embodiments have been explained with the transmission mechanisms 51, 151, 251 each constructed to have the gear module 62 constituted by a bevel gear by which the power outputted from the electric actuator 11 is converted on the same plane but in the perpendicular direction to be transmitted to each of the switching mechanisms 52, 152, 252.

However, the parking lock apparatus according to the present invention may be constructed with a transmission mechanism other than the previously mentioned transmissions. For example, the parking lock apparatus may be constructed to have a transmission mechanism having a worm gear combined with a worm and a worm wheel by which the power outputted from the electric actuator is converted on the same plane but in the perpendicular direction to be transmitted to the switching mechanism.

Another parking lock apparatus may be constructed to have the rotor shaft of the electric actuator directly connected with the switching mechanism, so that the power outputted from the electric actuator 11 can cause the switching mechanism to be directly operated.

The construction of the another parking lock apparatus can promptly and reliably be switched by the operation of the driver to selectively take the parking lock maintained state or the parking lock released state with the shift operation by the driver similarly to the parking lock apparatuses 10, 100, 200.

INDUSTRIAL APPLICABILITY

As has been explained in the above description, the parking lock apparatus according to the present invention can prevent the electric actuator from being accessed from the outside of the vehicle, thereby making it possible to prevent the parking lock mechanism from being lowered in function and to remarkably reduce the production cost as compared with the conventional parking lock apparatus. Therefore, the parking lock apparatus according to the present invention is useful for all of parking lock apparatuses to be mounted on the vehicle.

REFERENCE SIGNS LIST

1: vehicle
1H: first housing
1Ha, 2Ha, 41b: inner wall portion
1k: space
2: engine (power generation apparatus)
2H: second housing
3, 30: transaxle (power transmission apparatus)
3a: output shaft
4: parking switch.
10, 10, 200: parking lock apparatus
11: electric actuator
12, 112, 212: parking lock mechanism
13: electronic control unit (ECU)
14: fastening bolt
41: transaxle housing (second housing)
41c: extension portion
42: transaxle housing cover (second housing)
43: transaxle case (second housing)
44: transaxle rear cover (second housing)
51, 151, 251: transmission mechanism
52, 152, 252: switching mechanism.
90: automatic transmission (power transmission apparatus)
113, 213: bracket (support portion)

The invention claimed is:

1. A parking lock apparatus, comprising an electric actuator to be activated in response to a shift operation, and a parking lock mechanism to be operated by the electric actuator and capable of selectively taking a parking lock maintained state to have a stoppage state of the vehicle maintained or a parking lock released state to have the stoppage state of the vehicle released, in which
the electric actuator is supported on a support portion provided on at least either one of a first housing partly constituting a power generation apparatus for generating a power and a second housing, and the electric actuator is disposed in a space surrounded by an inner all portion of the first housing and an inner wall portion of the second housing.

2. A parking lock apparatus as set forth in claim 1, in which the second housing has an extension portion extending toward the first housing.

3. A parking lock apparatus as set forth in claim 1, in which the parking lock mechanism has a switching mechanism that is switched to selectively take a parking position corresponding to the parking lock maintained state or a non-parking position corresponding to the parking lock released state, a transmission mechanism that transmits the activation of the electric actuator to the switching mechanism, and a lock mechanism that locks not to output the power from a power transmission apparatus when the switching mechanism is switched to the parking position.

* * * * *